Nov. 20, 1934.  H. J. SMITH  1,981,282
THERMOSTAT CONTROL
Filed Sept. 14, 1932  2 Sheets-Sheet 1
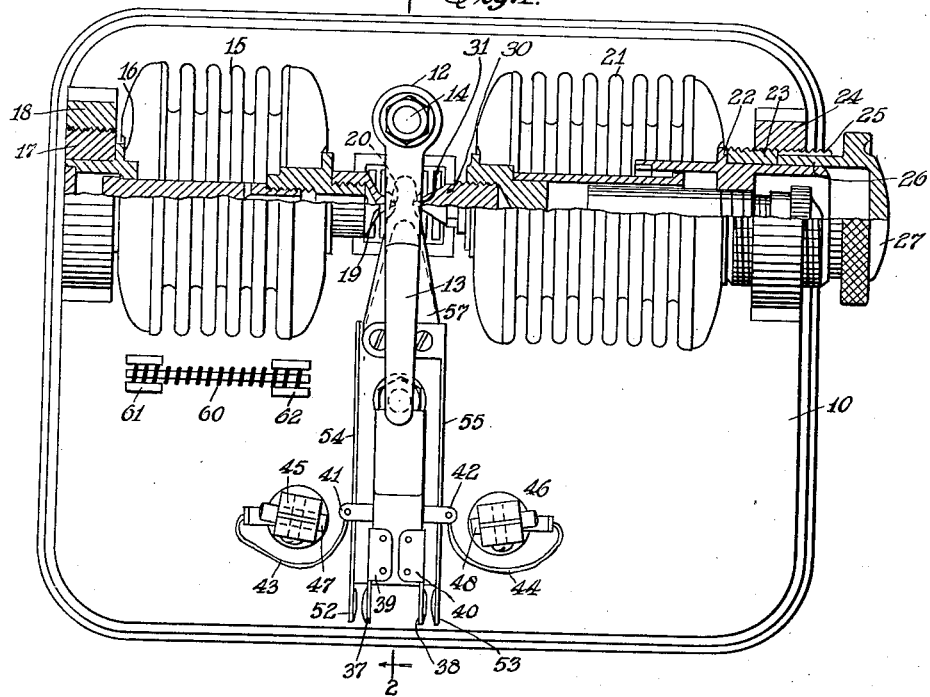
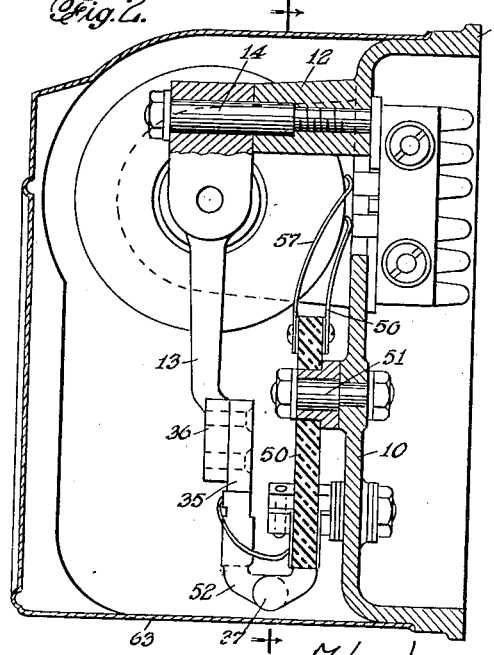
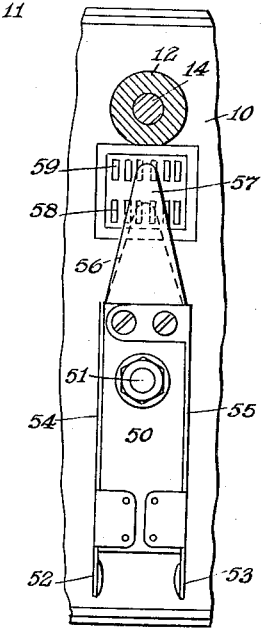
INVENTOR
ATTORNEY Nov. 20, 1934.                    H. J. SMITH                    1,981,282
                              THERMOSTAT CONTROL
                           Filed Sept. 14, 1932                 2 Sheets-Sheet 2
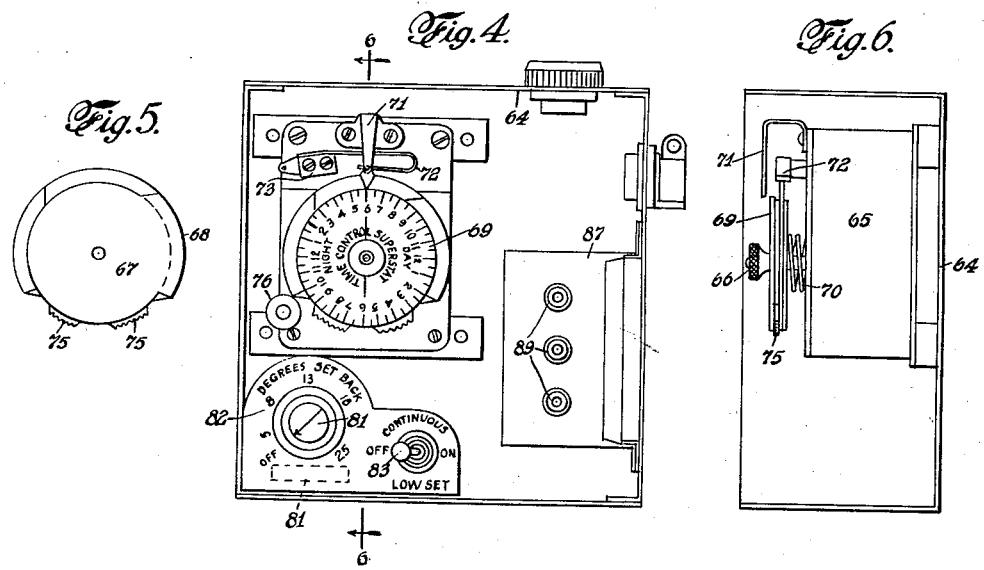
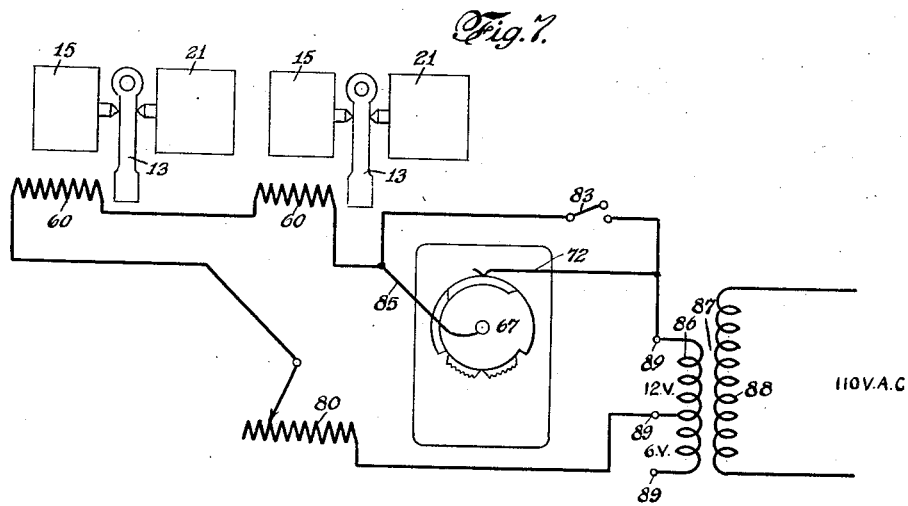

Patented Nov. 20, 1934

1,981,282

UNITED STATES PATENT OFFICE 1,981,282

THERMOSTAT CONTROL

Hazor J. Smith, Springfield, Mass., assignor to Superstat Company, Springfield, Mass., a corporation of Massachusetts Application September 14, 1932, Serial No. 633,109

2 Claims. (Cl. 236—46)

This invention relates to condition-control systems, and more particularly to a control means for modifying the action of a condition-control system and to a method and means for operating the same.

This invention is particularly applicable to the control of the temperature of a room or building and provides for periodically modifying the temperature thereof, although it is also useful in various other systems, wherein it is desirable to automatically control temperatures or pressures, such, for example, as for the control of the pressure in a steam boiler.

An object of the invention is to provide a modifying control for a condition-control system.

Another object is to provide a timed modifying control means adapted to automatically operate at regular intervals.

Another object is to provide manual means for selectively operating the control means at irregular intervals.

Another object is to provide a modifying control which operates without changing the setting of the condition-responsive device.

A further object is to provide a control for simultaneously modifying the action of a plurality of condition-responsive devices.

A still further object is to provide a simple, convenient and dependable device of the type above specified.

The above objects and others, which will be apparent as the nature of the invention is disclosed, are accomplished in a temperature-control system, for example, by providing a heat-modifying unit, such as a heating or refrigerating means, within the range of influence of the temperature-responsive element of the system. The heat-modifying unit, when energized, is adapted to create a false ambient temperature around the temperature-responsive device and to thereby modify the normal operation of the device. Means is provided for energizing the heat-modifying unit at predetermined intervals, which may be regular intervals corresponding, for example, to the hours of the day during which a higher or lower temperature is normally required, or may be irregular intervals corresponding, for example, to holidays.

Assuming, by way of illustration, that the temperature-responsive device is set to maintain a room temperature of 70°, the heat-modifying unit, in this case a heating unit, may be adjusted to increase the ambient temperature around the temperature-responsive device by say 10°, thereby creating a false ambient temperature of 80°. The temperature-responsive device then responds to this false ambient temperature and causes a reduction in room temperature to 60° so that the false ambient temperature, which is 10° higher than room temperature, becomes 70°. The above temperatures are merely illustrative, however, and it will be apparent that by controlling the heat of the heat-modifying unit and the time interval during which the same is energized, the room temperature may be controlled or modified as desired without changing the normal setting of the temperature-responsive device.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in the various figures of which like reference characters have been used to designate like parts.

In the drawings:

Figure 1 is a plan view of a condition-responsive unit constructed in accordance with the present invention with the cover removed to show the operating mechanism;

Figure 2 is a section taken on the line 2—2 of Figure 1;

Figure 3 is a fragmentary section taken on the line 3—3 of Figure 2;

Figure 4 is a side elevation of the control unit showing the timed contact mechanism;

Figure 5 is a detail view of the timed program member;

Figure 6 is a side elevation of the timed control unit showing the timed contact and program member; and Figure 7 is a diagrammatic representation of the control means showing the electrical connections between the various parts.

In the following description and in the claims, various details will be identified by specific names for convenience, but they are intended to be as generic in their application as the art will permit.

Referring to the drawings, the invention is shown, by way of illustration in Figures 1 and 2, as embodied in a temperature-responsive unit comprising a base 10 having a depending flange 11, which is adapted to rest on a supporting surface. The base 10 is also provided with an upstanding bracket 12 on which is supported a pivoted lever 13, as by a pin 14, which is extended through said lever and threaded into the bracket 12.

A temperature-responsive device such, for example, as a sylphon bellows 15, is provided with a base 16, which is carried in a bushing 17 mounted in an upstanding flange 18 formed on or rigidly secured to the base 10. The free end of the bellows 15 is provided with a pin 19, which seats in a recess 20 formed in one side of the lever 13.

A resilient means such, for example, as a second sylphon bellows 21, which may contain compressed air or other gas, is provided with a base 22 carried in a threaded bushing 23, which is mounted in an upstanding flange 24 formed on or secured to the base 10. The bushing 23 is threaded in the flange 24 for longitudinal movement therein, whereby the position of the bellows 21 may be varied. The bushing 23 is provided with a pair of recesses 25, which are adapted to receive prongs 26 formed on an operating handle 27 by which threaded adjustment of the bushing 23 is obtained. The bellows 21 is provided at its free end with a pin 30, which is seated in a recess 31 formed in the lever 13 opposite the recess 20 above mentioned.

The sylphon bellows 15 is adapted to expand or contract in response to variations in pressure of the substance contained therein. The lever 13 is resiliently held in engagement with the bellows 15 by the second bellows 21, which may be adjusted by any suitable means, such as by varying the pressure of the air or other gas contained therein or by varying the longitudinal position of the base 22 in the flange 24. It is obvious that variation of the pressure exerted by the bellows 21 will vary the operating range of the temperature-responsive device.

The free end of the lever 13 carries an insulating member 35 which may be secured thereto by screws 36. A pair of contacts 37 and 38 is carried by the member 35 and is connected by contact strips 39 and 40 to connecting lugs 41 and 42 respectively. The lugs 41 and 42 are connected by flexible conductors 43 and 44 to binding posts 45 and 46 respectively. Said binding posts may carry stop members 47 and 48, which limit the movement of the device in the manner to be described.

A contact lever 50 is pivoted to the base 10 as by a pivot pin 51, preferably beneath the lever 13 which is elevated sufficiently to provide clearance therefor. The contact lever 50 carries a pair of contacts 52 and 53, which are adapted to engage respectively the contacts 37 and 38 of the lever 13. The contacts 52 and 53 are carried by contact strips 54 and 55 respectively, which are in turn electrically connected to brushes 56 and 57 carried by the lever 50. The brushes 56 and 57 are adapted to slide over and make progressive contact with a progressive switch means comprising sets of contacts 58 and 59 respectively. The lever 50 is adapted to engage the stop members 47 and 48 above mentioned, which serve to limit the movement thereof.

It is to be understood that binding posts 45 and 46 and sets of contacts 58 and 59 are adapted to be connected to a progressive reversible motor-control device (not shown), which is capable of causing progressive operation of a temperature-control means, such as a furnace or the like, in such manner as to maintain a substantially constant, predetermined temperature, for example, a reversible motor-operated condition-control means of the type described more in detail in my copending application for Condition control apparatus, filed February 14, 1931, Serial No. 515,787. The invention is applicable to various condition-control systems and to various condition-responsive devices. A particular type of condition-responsive device has been shown merely by way of illustration.

A heating unit 60, such as an electrical resistance, is mounted adjacent the sylphon bellows 15 and may be carried by spring clips 61 and 62 by which electrical connection may be made thereto. The heating unit 60 is within the normal range of influence of the sylphon bellows 15 and serves to control the operation thereof in a manner to be set forth. The entire device may be closed by a suitable cover 63, which is adapted to seat on the flange 11 of the base 10.

For controlling the operation of the heating unit 60, there is provided a control unit (Figures 4-6) comprising a casing 64 in which a clock housing 65 is supported in any suitable manner. The clock housing 65 carries any standard clock mechanism, preferably a self-starting, synchronous, electric clock mechanism of well-known form having a twenty-four hour shaft 66. Program members or discs 67 having flanges 68 are adjustably mounted on the shaft 66. Upon the shaft 66 is also mounted an index disc 69, which carries suitable time designations. Program discs 67 are frictionally held against the index disc 69 by means of a spring 70. A pointer 71 carried by the clock housing 65 registers with the time designations on the index disc 69 to facilitate the proper setting of the clock. A contact brush 72 is carried by an insulating support 73, which is mounted on the housing 65. The brush 72 is adapted to engage flanges 68 of program discs 67 and to make electrical contact therewith. In the embodiment disclosed, three program discs 67 are provided, each of which has a flange 68. The flanges 68 are adapted to be rotated into overlapping position to obtain a contact arc of minimum length. The flanges may also be rotated through various intermediate positions into non-overlapping position, as illustrated in Figures 4 and 5, whereby a contact arc of maximum length is obtained. Three program discs have been shown merely by way of illustration. It is obvious that any desired number of program discs may be employed and that the range of operation of the device will be increased in accordance with the total number of discs. Certain of the program discs 67 may be provided with elevated grips 75 to facilitate adjustment of the device.

It is to be noted that timed contact brush 72 will engage flanges 68 of program discs 67 for a period determined by the setting of said discs 67 with respect to the index disc 69. In the setting shown in Figure 4, the brush 72 will engage the flanges 68 from 10 p. m. to 2 p. m. A handle 76 may be provided in a readily accessible position to permit the clock mechanism to be manually set. The clock is first set by causing the proper designation on the index disc 69 to register with the pointer 71. Discs 67 are then adjusted by manipulation of grips 75 to provide a contact arc coextensive with the designations on the index disc 69 representing the period during which it is desired to energize the heating unit.

A rheostat 80 having an operating handle 81 may also be mounted on casing 64 and provided with an index scale 82 for the purpose to be described. A make-and-break switch 83, which may be called a "holiday switch", may also be mounted on the casing 64, preferably in a position adjacent the rheostat 80.

Referring to Figure 7, a plurality of the heating units 60 are shown as connected in series with the rheostat 80 and with a lead 85, making electrical contact with the program discs 67. Timed contact brush 72 is connected to one side of the secondary 86 of a low voltage transformer 87. The other side of the secondary 86 is connected to the rheostat 80. The transformer 87 is provided with a primary 88, which is adapted to be connected to a power line, for example, to a 110 v. A. C. line. The secondary 86 is preferably formed with a plurality of taps 89, from which different voltages may be obtained, the particular voltage selected being dependent upon the number of heating units connected in the circuit and the total resistance thereof. The secondary 86 is shown as adapted to produce 18 volts and as provided with 6 volt and 12 volt taps. The transformer 87 may be mounted on the casing 64 in any suitable manner to form a part of the control unit.

The switch 83 is connected between the timed contact brush 72 and the program discs 67 and is adapted, when closed, to short circuit the timed contact mechanism.

In the operation of the above-described device, the heating unit 60 will be energized when either the timed contact mechanism or the holiday switch 83 is closed, and, when energized, will produce an amount of heat dependent upon the setting of the rheostat 80 and the voltage supplied by the transformer 87. The heat produced by the heating unit 60 produces a false ambient temperature around the sylphon bellows 15. If, for example, the device is set to normally maintain a room temperature of 70° and the heating unit 60 raises the ambient temperature of the device by say 10°, the temperature-responsive device will operate to maintain a room temperature such that the ambient temperature is 70°. Since this ambient temperature is dependent upon the room temperature and the superimposed heat of the heating unit, it is obvious that the true room temperature will be less than 70° or, in the above example, approximately 60°. The heating unit accordingly produces a temperature setback which is capable of operating without changing the adjustment of the temperature-responsive element itself. The index 82 may be calibrated to read degrees of setback so as to facilitate the manual setting of the device to produce any desired temperature. The time of operation may be controlled by the setting of the program discs 67 in the manner above described.

The above-described system is capable of operating at regular intervals as, for example, to reduce the temperature in a building during the night. In certain instances, such as in public buildings, it may be desirable to also reduce the temperature over a holiday or at other irregular intervals. For this purpose, the holiday switch 83 is provided. If the timed contact mechanism is normally set to reduce the temperature from say 5 p. m. until 6 a. m. and in addition it is desired to reduce the temperature from Saturday noon until Monday morning, the holiday switch 83 would be closed at Saturday noon, thereby energizing the heating unit 60 and operating the device in the manner above described. The system will then maintain the reduced temperature as long as either the holiday switch or the timed contact is closed. On Sunday night, the holiday switch 83 would be opened, whereupon the timed contact brush 72 assumes control and will restore the temperature to normal when contact is broken with the program discs 67 at 6 a. m. on the following morning.

Although the above-described system has been illustrated as applied to a particular type of temperature-responsive device, it is to be understood that it is not limited thereto but is applicable to any standard type of temperature-responsive mechanism. Furthermore, any number of temperature-responsive elements may be operated simultaneously by connecting the various units 60 in series and suitably selecting the resistance of the rheostat 80 and the voltage of the transformer 87 to provide the correct operating characteristics. This feature is important in public buildings or institutions where a plurality of remotely located temperature-responsive elements are used, inasmuch as it permits a master control to be employed for the entire system.

It will also be obvious that various other changes and modifications may be made without departing from the spirit of the present invention and that the invention is only to be limited in accordance with the following claims when interpreted in view of the prior art.

I claim:

1. A program member comprising a timed shaft, an index disc rigidly mounted on said shaft, a plurality of program discs having contact flanges loosely mounted on said shaft, and resilient means frictionally holding said program discs against said index disc, said contact flanges extending around a part only of the periphery of said program discs and being in adjustable overlapping relationship, whereby the peripheral arc of said flanges with respect to said index disc may be varied.

2. In combination, a temperature-responsive device, an electric heating unit within the range of influence thereof and adapted to produce a false ambient temperature, and a control unit comprising a casing, timed contact mechanism carried thereby, a rhoestat carried by said casing and having a control handle, an index indicating the degrees of setback associated with said control handle, and switch means mounted on said casing, said rheostat, timed contact mechanism and switch being connected in circuit with said electric heating unit and adapted to control the operation thereof.

HAZOR J. SMITH.